United States Patent [19]

Pestka

[11] 3,852,849
[45] Dec. 10, 1974

[54] PANEL MOUNTING FASTENER
[75] Inventor: John A. Pestka, Park Ridge, Ill.
[73] Assignee: Illinois Tool Works, Inc., Chicago, Ill.
[22] Filed: Dec. 26, 1973
[21] Appl. No.: 428,509

[52] U.S. Cl.............. 24/73 P, 24/221 R, 85/5 R, 317/101 CC
[51] Int. Cl.............. F16b 19/00, A44b 21/00
[58] Field of Search........... 24/73 P, 73 PF, 73 PM, 24/73 RM, 221 R; 85/5 R; 339/17 R, 17 M; 317/101 CC

[56] References Cited
UNITED STATES PATENTS

| 2,580,319 | 12/1951 | Poupitch | 24/221 R |
| 3,190,167 | 6/1965 | Holton | 85/5 R |
| 3,568,263 | 3/1971 | Meehan | 317/101 CC UX |
| 3,651,545 | 3/1972 | Hara | 24/73 P |
| 3,707,108 | 12/1972 | Pabich | 317/101 CC UX |
| 3,764,729 | 10/1973 | Kowalewski | 85/5 R X |
| 3,776,495 | 12/1973 | Hartz et al | 24/73 P X |
| 3,777,052 | 12/1973 | Fegen | 85/5 R X |

Primary Examiner—Donald A. Griffin
Attorney, Agent, or Firm—Robert W. Beart; J. R. Halvorsen

[57] ABSTRACT

A one-piece rotatable plastic fastener for rigidly mounting at least one panel in predetermined space relation to a support. The support being adapted to carry a male terminal having a predetermined axial length extending substantially normal to a reference surface of said support and the panel carrying a female terminal having a predetermined position relative to said panel whereby when said panel is oriented and maintained at a predetermined distance from said support said female terminal will telescopically engage said male terminal at a pre-selected optimum contact position, said fastener being designed to maintain said support and panel in a removably fastened relation at said predetermined distance.

4 Claims, 3 Drawing Figures

PATENTED DEC 10 1974

3,852,849

PANEL MOUNTING FASTENER

BACKGROUND OF THE INVENTION

1. Field of the Invention.

This invention is in the field of dielectric fasteners of the type in which two planar members are fastened together by positioning the fastener in the support panel and by rotating the fastener the second panel is releasably locked into a spaced parallel relationship to the other panel.

2. Description of the Prior Art.

This invention is an improvement of my co-pending application, Ser. No. 335,629, filed Feb. 26, 1973 and now U.S. Pat. No. 3,811,154 — issued May 21, 1974, as a joint invention with R. J. Lindeman and myself. In the past, printed circuit modules have been fastened to a chassis with the use of conventional joining elements such as bolts, spacers, spring washers and the like until the advent of one-piece plastic fasteners such as shown in my co-pending application set forth above and by fasteners of the type shown in the U.S. Pat. Nos. to Kowalewski, 3,764,729, Meehan, 3,568,263, and Pabich 3,707,108. In each of these prior art patents there is a common problem of a space variation as well as a simplistic approach to merely fastening two panels together. There appears to be more concern for simple tolerance takeup than for the requirement of maintaining a pair of panels consisting of a support panel or chassis and a printed circuit board in predetermined parallel spaced relation. To eliminate conventional hardware equipment and to improve upon the prior art it is an object of the present invention to provide a one-piece dielectric fastener capable of maintaining such panels in spaced parallel relationship to one another at a predetermined distance. An additional object is to provide a fastener which can be manually inserted and rotated by an operator without secondary adjustments.

SUMMARY OF THE INVENTION

In the electronics field it has been found desirable to mount a plurality of male blade-type terminal contacts in a block which is mounted in a fixed relationship to a chassis. An equal number of female contacts are mounted in a printed circuit board and connected by suitable means to various elements mounted on the printed circuit board. When the female contact is telescoped into engagement with the male contact it is desirable to insure that a predetermined optimum position is obtained. This must be done in such a fashion as to provide a uniformity in production without operator adjustment. The present invention provides a releasable lock support which establishes spaced planar engaging means relative to reference surfaces on said chassis and printed circuit board and is adapted to maintain them in such locked position by engaging the reference surfaces. The present invention additionally compensates for manufacturing tolerances in the thickness of the chassis and the printed circuit board and yet maintains this desired optimum spatial relationship. The preferred embodiment includes a central axially disposed body portion, a pair of spaced flanges, a resilient stud means having positive shoulder means extending from one end of said body portion for engagement with one reference surface of the chassis with one of said flanges resiliently acting on the opposite surface of the chassis to insure engagement with the shoulder means and a second reference surface being supplied by the upper surface of the rigid second flange spaced from the first mentioned flange. A wing element extends laterally in spaced relation to the rigid flange reference surface and includes a depending resilient arm for engagement with the opposite surface of the printed circuit board from the surface engaging the reference surface on said flange. The device is capable of supporting the edges of two printed circuit boards or, alternatively, the edge of a single printed circuit board or a keyhole slot in a single printed circuit board.

DESCRIPTION

Figure 1:
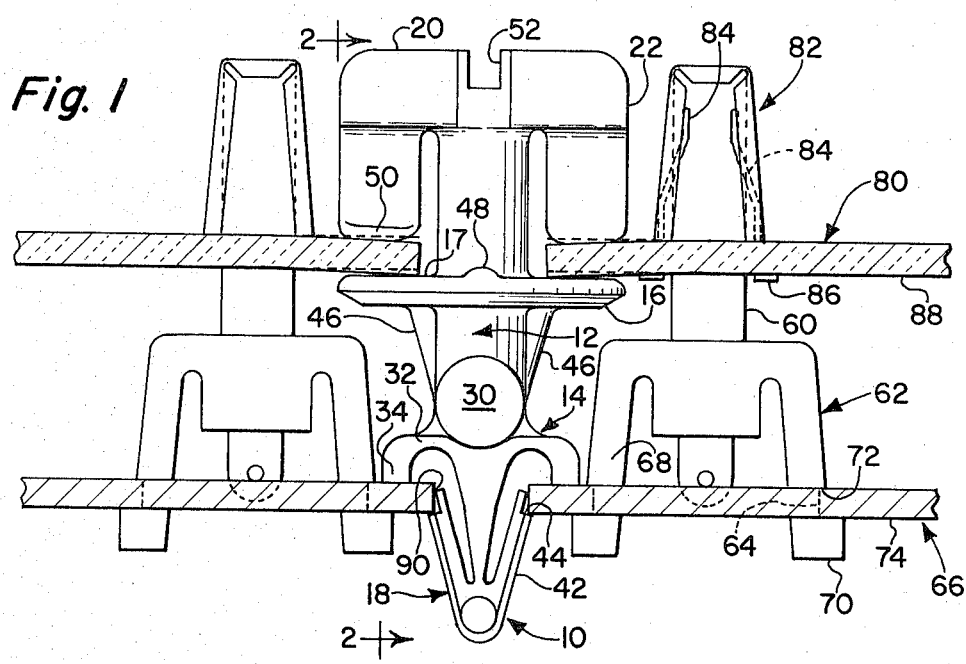
FIG. 1 is a vertical elevation, in partial section, of a preferred embodiment of the present invention in mounted relationship to a pair of printed circuit boards and a chassis or support panel.
Figure 2:
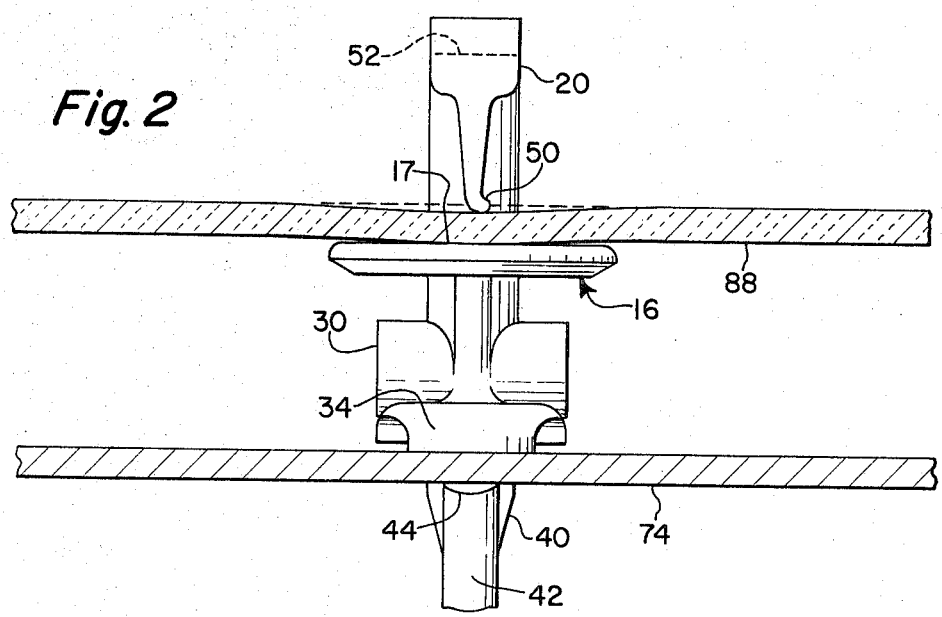
FIG. 2 is a side elevation of the fastener shown in FIG. 1 with the male and female contacts shown in FIG. 1 being removed for purposes of clarity.

Refering now to the figures, wherein the same numerals are utilized to identify the same parts, a fastener 10 of the type contemplated by the present invention includes an axially extending central body portion 12, a pair of spaced flanges 14 and 16, a resilient stud means 18 extending from one end of the body portion 12 and at least one wing element 20 extending laterally from the opposite end of said body portion 12, each wing element 20 including a depending resilient arm 22.

The body portion 12 is a substantial rigid columnar element and includes a lower reinforcing means 30 with the first flange means 14 extending laterally outwardly from opposite sides thereof. The flange means 14 is generally rectangular in plan configuration in this embodiment and includes a first section 32 extending transversely from the reinforcing means 30 and a substantially rigid depending portion 34 extending in a generally axial direction. With this structural configuration it is possible to provide a resilient bridging type of panel engagement having a relatively high degree of stiffness, as will be described hereinafter. Extending from same end of body portion 12 is stud element 18. This includes a tapered central rigid portion 40 and a pair of upwardly extending resilient leg elements 42 having positive shoulder means 44 adjacent the free extremities of the legs 42 and in opposition to flange 14.

Positioned in spaced relation to the flange 14 is the other laterally extending flange 16, generally cylindrical in configuration and supported in opposite quadrants thereof by axially extending gussets 46. The reinforcing gussets 46 render the flange 16 substantially rigid at opposite sides which lie in a plane falling on the axis of the body portion 12 thereby providing a substantially rigid shelf-like upper surface 17 or reference plane perpendicular to the axis of the fastener. Positioned in quatrature to the gussets 46 are a pair of cammed protuberances or ribs 48 which extend upwardly from the flange 16. The protuberance 48 preferably is positioned on an unsupported portion of flange 16 which is capable of flexure whereby protuberance 48 serves as a resilient locking detent, as will be described hereinafter.

At the upper free end of the body portion 12, as viewed in the drawing, the present embodiment includes a pair of laterally extending substantially rigid wing elements 20. Depending from each of the wing elements 20 is a tapered resilient arm having a cammed lower surface 50. The cammed surface 50 is spaced from the upper surface of the other flange 16 a predetermined distance which is equal to or less than the thickness of a printed circuit board to be supported therebetween.

A kerf 52 may be provided which extends transversely into the end of body portion 12 in perpendicular relationship to the rigid wing elements 20 for engagement by a suitable tool, not shown, for inducing rotation of the fastener if manual gripping of the wing elements 20 is insufficient to accomplish the desired rotary movement of the fastener 10.

In the electronic field it has been found that it is desirable to facilitate rapid assembly of modular components by providing axially telescopable contact terminals consisting of a male and female contact. This eliminates the necessity of secondary wiring, permits replacement of entire modules and generally increases the efficiency of assembly. A primary problem in the use of such contacts is to insure that the male contact is inserted to a predetermined optimum position within the female contact. In the present embodiment a plurality of male contacts of a single spade-like blade configuration are mounted in a terminal block of dielectric material. In FIG. 1 a single tapered blade male contact 60 is illustrated but it must be appreciated that a plurality of these can be positioned in spaced relation in the terminal block 62 along an axis perpendicular to the drawing. The terminal block 62 is mounted in an elongated slot 64 in chassis 66. The type of terminal block utilized is subject to selection by the ultimate user of the fastener of this invention but in the illustrated embodiment the terminal block 62 has a pair of opposed legs 68 having a head 70 and a shoulder means 72 thereby permitting the terminal block with its associated male contacts to be snapped into the slot in the chassis 66. The undersurface 74 of chassis 66 is chosen as a reference surface since the head 70 engages this reference surface 74 and establishes a predetermined extent to which the blade 60 will project relative to said reference surface.

The printed circuit board 80 carries a plurality of female contacts 82, that are equal in number to the male contacts carried by the terminal block. The female contacts in this embodiment are inserted into a plurality of apertures in the board and include opposed channel-shaped sidewalls connected by a similar channel-shaped base. The channel-shaped sidewalls are generally U-shaped in configuration and have a spring arm contact 84 struck from the base of the channel section and extending inwardly into the space between opposite sidewalls to serve as spring urged contact means. Each of the sidewalls terminates in a laterally extending flange 86 which serves as a head and contacts the underside, as viewed in the drawing, or reference surface 88 of the printed circuit board 80. The location of reference surface 88 a predetermined distance relative to reference surface 74 insures the optimum spacing of the printed circuit board 80 from the chassis 66 and will provide the optimum contact desired by insuring the engagement of spring arms 84 with the tapered edges of the blade contact 60 at a predetermined point.

In the use of the present fastener 10, the fastener is snapped into assembled relation with a circular aperture 90 in the chassis 66. The fastener is initially placed in a position 90° from that shown in FIG. 1. One or more printed circuit boards 80 are positioned on the upper or reference surface 17 of flange 16. The boards 80 are oriented so that they will initially rest on the protuberance 48 with the blade contact 60 partially axially telescoped within the female contact 82. The fastener is then rotated 90° to the position shown in FIG. 1. As was previously indicated, the cam surface 50 of resilient arms 22 is spaced from the upper or reference surface 17 of flange 16 a predetermined distance which is less than the thickness of the printed circuit board. As is shown in the drawing in phantom, the dotted lines denote the position of the printed circuit board before rotation of the fastener. The rotation of the fastener results in flexing of arms 22 and the pressure of the arms 22 moves the boards 80 to a position in intimate engagement with the rigid quadrant of flange 16 as supported by gussets 46. The female contact 82 is thereby moved into its optimum contact position relative to the male or blade contact 60. The reference surface of shoulders 44 on resilient legs 42 are maintained in intimate contact with the reference surface 74 of chassis 66 by the stiff resilience of flange 14.

It will be appreciated that other forms of contact assemblies differing in construction to the one shown in the present embodiment can be utilized and that such other structures also have an optimum contact position.

The present fastener will be maintained in substantially normal relationship to an apertured chassis even though only one printed circuit board is utilized due to the stiff resilient nature of flange 14 and its bridge action provided by the lateral element 32 and the vertical strut-like legs 34. It has sufficient stiffness to overcome any cocking action which may be occasioned by having an undistributed force on only one side of its axis when a single board is supported by it.

The present fastener can be injection molded or suitably formed from dielectric plastic materials by normal molding methods.

Figure 3:
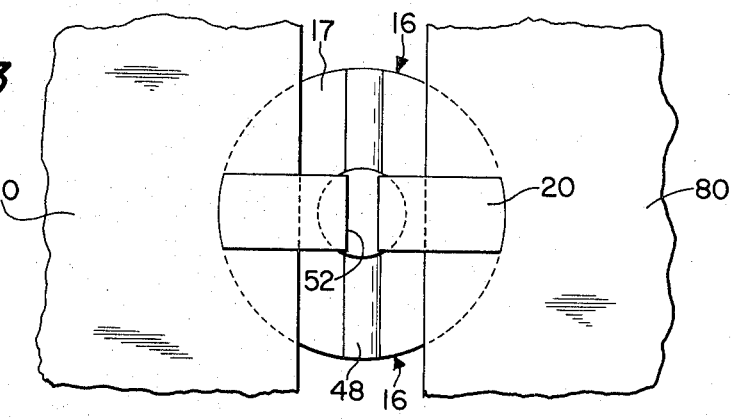
FIG. 3 is a plan view in partial section of the embodiment of this invention in mounted relationship to a pair of printed circuit boards.

When the fastener is in its ultimate locked position, as shown in FIG. 3, the cam surfaced protuberances or ribs 48 serve as a locking means against unintentional retrograde rotation of the fastener by bearing against the edge of the printed circuit boards should the fastener rotate due to vibration or other shock. The arms 22 will remain in contact with the upper surface of the boards until after the cam-shaped rib 48 is overcome by the application of a specific retrograde rotation force.

Thus, it can be seen that the present embodiment provides an efficient, economical, manually operable fastener which will maintain two planar elements in predetermined spaced relation. Normally, a plurality of such fasteners are positioned at the edges of a printed circuit board. Preferably the male and female contacts are located in close proximity to the edge of the printed circuit boards to insure non-flexing of the board which would be deleterious to the desired result of optimum contact position.

Other applications of this fastener will be apparent to those skilled in the art where it is desirable to maintain two planar members in predetermined relationship.

I claim:

1. A one-piece plastic rotatable fastener for mounting at least one panel in predetermined spaced relation to a support, said support carrying a male contact having a predetermined axial length in relation to one reference surface of said support, said panel including a female contact having a predetermined position relative to said panel whereby when said panel is oriented and maintained at a predetermined distance from said support said female contact will telescopically engage said male contact at a preselected optimum position, said fastener including a central axially extending body portion, flange means extending radially outwardly from predetermined spaced positions on said body portion, resilient stud means extending axially from one end of said body portion and having positive shoulder means spaced from and in opposing relation to one of said flange means and adapted to be snapped into said apertured support means with said shoulder means contacting said predetermined reference surface of said support means, said stud means adapted to be positively axially retained against inadvertent removal but capable of rotation within said aperture of the support means, said body portion extending axially beyond said other flange means at the end opposite said stud and carrying at least one substantially rigid wing element extending radially outwardly in overlying spaced relation to said other flange means, said wing element including a depending resilient arm the free end of which is spaced from said other flange means a distance less than the thickness of said panel, said other flange means having the surface facing said flexible arm acting as a reference plane spaced from said shoulder means said predetermined distance whereby rotation of said fastener results in said flexible arm forcing said panel into intimate engagement with said other flange means reference surface thereby insuring accurate positionment of said male contact within said female contact to obtain the predetermined optimum contact between said male and female contacts.

2. A fastener of the type claimed in claim 1 wherein said body portion is a substantially rigid columnar member supporting said flange means adjacent opposite ends thereof and reinforcing means engaging said other flange means against flexing in a plane disposed along the axis of said body portion and in which plane said resilient arms are initially located thereby insuring a positive relative spacing between said shoulder means and said other flange means.

3. A fastener of the type claimed in claim 2 wherein said first mentioned flange means is flexible in a plane including said shoulder means to insure acceptance of a wide variation of tolerance in the thickness of said support and to maintain said shoulder means in intimate engagement with the reference surface of said support.

4. A device of the type claimed in claim 1 wherein said fastener includes a pair of rigid wing elements extending radially outwardly in overlying spaced relation to said other flange and with each wing element carrying a dependent resilient flexible arm having a cammed free extremity spaced from said other flange means a distance less than the thickness of said panel with said fastener being adapted to be inserted into said support, a pair of panels laid on said other flange means on opposite sides of said wing elements and said fastener rotated into overlying relationship with said resilient flexible arms moving in opposite directions relative to said plane in which they initially fall to insure positive engagement of said panels with the reference surface of said other flange.

* * * * *